United States Patent
George et al.

(10) Patent No.: US 9,690,832 B2
(45) Date of Patent: Jun. 27, 2017

(54) ENTERPRISE REPORTING CAPABILITIES IN STORAGE MANAGEMENT SYSTEMS

(71) Applicant: NetApp, Inc., Sunnyvale, CA (US)

(72) Inventors: Jimmy George, Bangalore (IN); Rajath Ranganath, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 390 days.

(21) Appl. No.: 14/507,409

(22) Filed: Oct. 6, 2014

(65) Prior Publication Data

US 2016/0098462 A1    Apr. 7, 2016

(51) Int. Cl.
*G06F 17/30* (2006.01)

(52) U.S. Cl.
CPC .. *G06F 17/30554* (2013.01); *G06F 17/30383* (2013.01)

(58) Field of Classification Search
CPC ................................................. G06F 17/30457
See application file for complete search history.

(56) References Cited

U.S. PATENT DOCUMENTS

| | | | |
|---|---|---|---|
| 6,014,670 A | 1/2000 | Zamaniar et al. | |
| 6,134,543 A | 10/2000 | Witkowski et al. | |
| 6,708,179 B1 | 3/2004 | Arora | |
| 6,882,993 B1 | 4/2005 | Lawande et al. | |
| 7,111,020 B1 | 9/2006 | Gupta et al. | |
| 7,117,215 B1 | 10/2006 | Kanchwalla et al. | |
| 7,290,214 B2 | 10/2007 | Sidle et al. | |
| 7,895,186 B2 | 2/2011 | Yu | |
| 8,868,544 B2 * | 10/2014 | Witkowski | G06F 17/30592 707/713 |
| 2005/0023497 A1 | 2/2005 | Gethmann | |
| 2005/0235001 A1 | 10/2005 | Peleg et al. | |
| 2005/0235004 A1 * | 10/2005 | Folkert | G06F 17/30457 |
| 2005/0235011 A1 | 10/2005 | Minium, Jr. et al. | |
| 2006/0212436 A1 * | 9/2006 | Gupta | G06F 17/30457 |
| 2009/0037489 A1 * | 2/2009 | Grundler | G06Q 10/10 |
| 2012/0047117 A1 * | 2/2012 | Nica | G06F 17/30457 707/702 |
| 2012/0166446 A1 * | 6/2012 | Bowman | G06F 17/30327 707/743 |

FOREIGN PATENT DOCUMENTS

| | | |
|---|---|---|
| EP | 2040180 | 3/2009 |
| EP | 2463789 | 6/2012 |

* cited by examiner

*Primary Examiner* — Mohammad S Rostami
(74) *Attorney, Agent, or Firm* — Klein, O'Neill & Singh, LLP

(57) ABSTRACT

A method of refreshing a materialized view includes creating a materialized view based on a first result of a database query executed against a set of tables stored in a database and discovering a set of child storage objects associated with a parent storage object. The method also includes inserting, based on discovering the set of child storage objects, an entry into one or more tables of the set of tables, the entry including a child storage object of the set of child storage objects. The method further includes delaying a refresh of the materialized view until after the entry is inserted into the set of tables and then refreshing the materialized view, which is based on a second result of the database query executed against the set of tables.

18 Claims, 7 Drawing Sheets

ENTERPRISE REPORTING CAPABILITIES IN STORAGE MANAGEMENT SYSTEMS

TECHNICAL FIELD

The present disclosure relates generally to computing systems and, more particularly, to storage and reporting in storage management systems.

BACKGROUND

Information storage systems may include a variety of different hardware and software components. For instance, a storage system may include one or more storage controllers, where each of the storage controllers provides the low-level control for a plurality of physical storage drives. The storage system may also include network connections and other items that are ancillary to the storage functionality of the system. Storage systems continue to become more and more complex, with storage controllers hosting an increasing number of logical storage volumes and storage controllers being clustered rather than simply standing alone.

An information storage management system may have at least two different entities. A first entity may include a monitoring entity that discovers the objects (e.g., storage controllers) that are managed by the information storage management system and persists them in a production database. A second entity may include a reporting entity that parses the inventory and displays the important data to the user as reports. The schema for database tables is designed with particular emphasis on what kinds of operations are performed on the tables. The monitoring entity performs frequent insertions and updates to the tables. Accordingly, it may be desirable for the tables that are used by the monitoring entity to be optimized for such transactions (e.g., faster updates). The reporting entity submits queries to the database and generates reports. Accordingly, it may be desirable for the tables that are used by the reporting entity to be optimized for such transactions.

A single schema, however, is typically not used to address both of these optimizations. In an example, a database that is optimized for updates by the monitoring entity is typically not optimized for reporting. In particular, although the database table schema may be optimized for transactions that update the database tables (e.g., insertions), the schema may not be conducive to efficiently querying the database tables. The database table schema may adversely affect the performance of querying the database tables and generating reports.

To overcome this disadvantage, a data warehouse may be built on a separate system by extracting the data stored in the production database, transforming the extracted data into another form that is conducive to efficiently querying the data, and storing the transformed data in the data warehouse. In such a data management solution, the warehouse may be optimized for reporting and built on a system that is separate from the production database. Data stored in the data warehouse may be refreshed from the database tables to keep the warehouse and the data in the production database consistent. The data warehouse may be arranged to better support querying instead of updates. In an example, the data warehouse may include a server deployed for providing services such as reporting, chargeback, and billing purposes.

DETAILED DESCRIPTION

Figure 1:
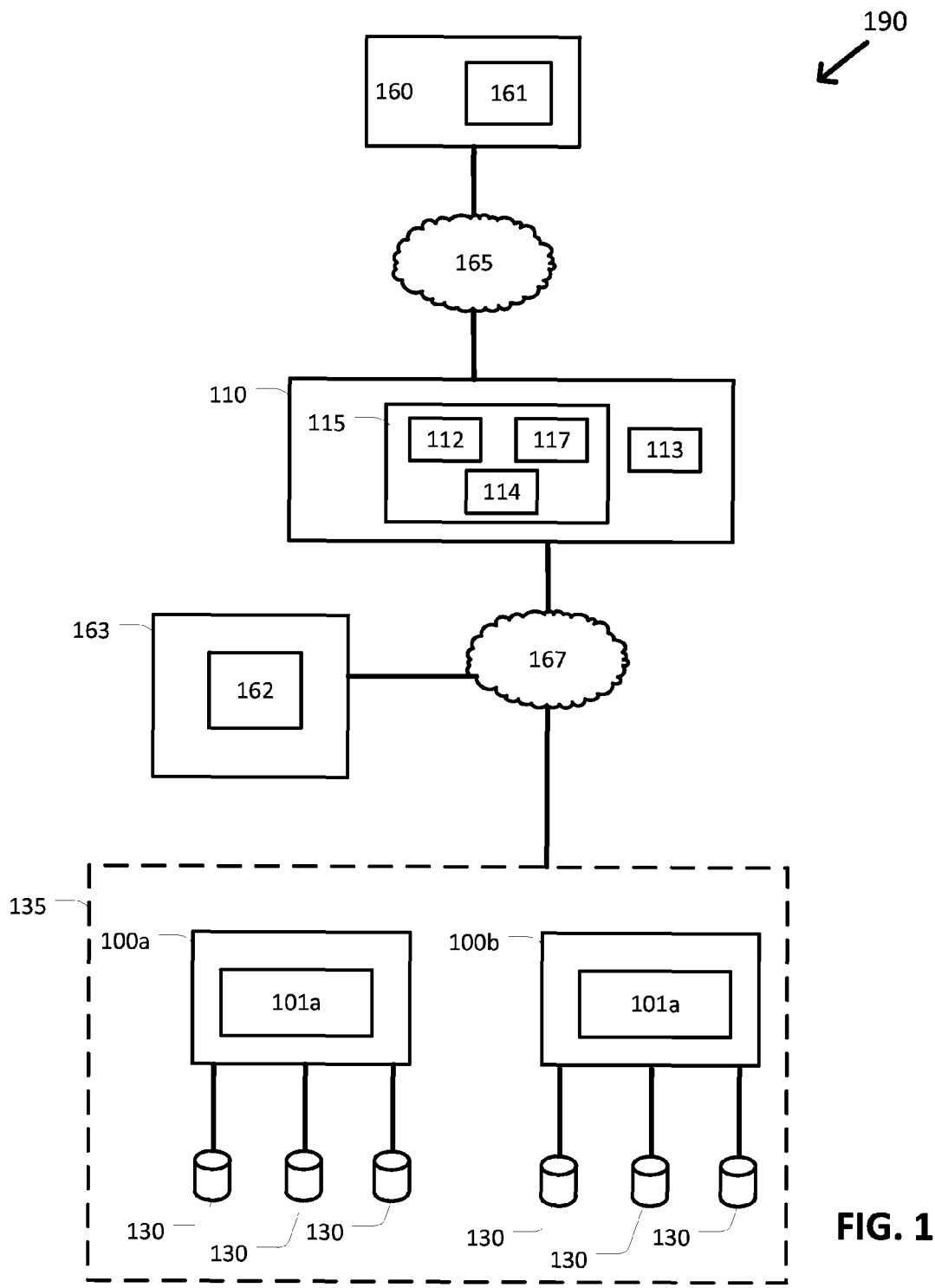
FIG. 1 is an illustration of a storage system adapted according to some embodiments.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

I. Overview

A view is a virtual table whose contents are defined by a query and is a specific representation of a table or set of tables. The view contains rows and columns, like a real table that is stored in a database, and the fields in the view are fields from one or more real tables in the database. A view, however, is not stored on disk and is not an actual table in the database. Rather, the rows and columns of data in the view come from tables referenced in the query defining the view and are produced dynamically when the view is referenced. In particular, the data accessible through the view is not stored in the database as a distinct object. Thus, if the virtual table is queried, the underlying query for the view is executed each time to retrieve the results.

A view may be an expensive operation that is time consuming. For example, the view may be based on a query including multiple "join" and/or "group by" clauses that are executed against large database tables. A view is computed on-the-fly, and its data is not stored separately from the tables on which the view is defined. Thus, queries using views, by definition, guarantee that up-to-date data will be returned. Any change in the source tables on which the view is defined will be reflected by the view instantaneously.

A materialized view, on the other hand, is a static object that derives its data from underlying base tables. In particular, a materialized view is an object containing pre-computed results from a query and may be used to increase the speed of queries that peruse large amounts of data. In an example, the materialized view includes the end result of a query and is a persistent object that may be cached in database memory. Materialized views have a physical representation that occupies space. In an example, a database may include a first table and a second table. A database query may be executed against the first and second tables to determine a result. A materialized view may be created based on the result from the query and stored in the database. In an example, the materialized view is cached in memory alongside data from the first and second tables. The schema for the materialized view may be designed to be efficient for querying. To generate reports, rather than executing a query against the first and second tables, the materialized view may be directly queried instead to retrieve a result of the query. Accordingly, compute-intensive and resource-intensive operations may be avoided by executing queries against materialized views rather than the underlying database tables.

If a materialized view is infrequently refreshed, the data in the materialized view may be inconsistent with the underlying tables. Various embodiments of the present disclosure provide building a data warehouse on the same production database using materialized views and a policy to refresh the materialized views in the warehouse in an improved and efficient manner. An embodiment of the disclosure provides a system for data monitoring and reporting, and may have an advantage of striking a balance between the desire to have up-to-date data in the data warehouse while reducing the number of times the costly queries, which update the data warehouse, are executed. Thus, use of the materialized views may eliminate a considerable lag between the time data is collected and is available for analysis and generating reports. In an example, the materialized views (e.g., DB caches) are refreshed in a more controlled fashion to reduce the usage of the disk resources and to reduce contention between monitoring and reporting disk access. In effect, even though the underlying tables in the production database have changed, updates to the materialized view may be delayed to a later point in time. The controlled refreshing of the materialized views may avoid unnecessary lag time and reduce processing overhead.

The example of FIG. 1 below is directed to a storage system, and the scope of embodiments is applicable to a wide variety of computer systems other than storage systems. Accordingly, the concepts described herein for monitoring, analyzing, and reporting system data may be applied to computing systems generally.

II. Example System Architecture

FIG. 1 is an illustration of a network storage system 190 adapted according to some embodiments. Various embodiments of the present disclosure may be implemented by the network storage system 190, as described in more detail below.

The system 190 includes a server 110 coupled to a server 163 and a storage cluster 135 via a network 167, and coupled to a client system 160 via a network 165. The system 190 also includes server 163 coupled to server 110 and cluster 135 via network 167, and coupled to client system 160 via networks 165, 167.

Network 165, 167 may be any kind of network including a local area network (LAN), such as an Ethernet, and/or a wide area network (WAN), such as the Internet. In some examples, server 110 and/or 163 may be a standalone workstation, a cluster, a production server, within a virtual machine, and/or the like. The servers 110, 163 include a processor coupled to memory. In some examples, a processor may control operation and/or execution of hardware and/or software on a respective server 110, 163. Each server 110, 163 may include multiple processors, CPUs, multi-core processors, field programmable gate arrays (FPGAs), application specific integrated circuits (ASICs), and/or the like. Memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

A server 110, 163 may access storage subsystems 100 that are connected to the server via network 167. The storage subsystems 100 are included in cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to the server system(s) and client 160. Examples of storage hardware that can be used as physical storage devices 130 include, e.g., hard disk drives and solid state drives, though the scope of embodiments is not limited to any particular storage hardware.

Each storage device 130 may store data from logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130.

Client system 160 may run one or more applications (e.g., word processing or database programs, typified by application 161) that use the storage system. Client system 160 includes a computer system that interacts with server 110 for submitting read/write access requests and for receiving or transmitting data from or to the server 110 over the network 165. In a virtual server environment, application 161 on client system 160 may interact over the network 165 with one or more virtual machines (VMs) 115 executing on server 110 and application 161 on client system 160 may interact over the network 165, 167 with one or more virtual machines (VMs) 162 executing on server 163. Application 161 may be, for example, a database or email server.

A database may include data stored in multiple storage devices 130. An embodiment may provide a data warehouse built from the data stored in the database using materialized views. As mentioned above, various embodiments include a system monitoring tool that discovers storage objects on a network and persists their discovery in a database (e.g., production database). A storage object, for example, may include any system asset such as a virtual volume, network node, storage controller, server, host machine, virtual machine, application, network, and/or the like. The database includes a plurality of tables designed with particular emphasis on the operations to be executed against the tables. The system monitoring tool may perform frequent updates to the tables, which may be optimized for update transactions (e.g., insertions). In an example, the system monitoring tool may scan a network and discover new storage objects on the network. In such an example, the system monitoring tool may insert entries into the database, where each entry includes a newly discovered storage object.

Additionally, various embodiments include a reporting tool that parses data stored in a database and generates reports for users. The reporting tool may perform frequent querying on the database and display important data to users. It may be desirable for the tables queried by the reporting tool to be optimized for providing results based on the queries. In an example, the system monitoring tool and reporting tool may be incorporated into an enterprise storage management system.

System 190 includes a system monitoring tool that is implemented as an application. For instance, a system monitoring tool can be implemented as application 161 at client 160. Additionally or alternatively, the system monitoring tool may be implemented as one of applications 112, 114, 117 in server 110. For the purposes of this example, application 117 is described as the system monitoring tool. The system monitoring tool 117 may receive system data by communicating with storage operating systems at each storage controller 101. For instance, system monitoring tool 117 may communicate via API to receive system information, such as hardware names, volume names, usage data, read and write operations per second, and the like. Various types of system information are described in more detail below. In short, the system information of this example includes any type of information that allows system monitoring tool 117 to construct a comprehensive description of the architecture and/or performance of system 190.

Storage Operating Systems (OSs) run on storage controllers 100. The scope of embodiments may include any appropriate storage OS that provides low-level control to implement virtual storage on storage drives. Storage OS instances run on one or more processors at storage controllers 100. Also, communication between storage OSs and system monitoring tool 117 go through communication links, such as network 167.

Server 110 includes a computer system that executes applications and interacts with the client system 160 for receiving read/write access requests and receiving or transmitting data from or to the client system 160 over the network 165. Server 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Server 110 may include hypervisor 113, which creates and manages one or more Virtual Machines (VMs)—in this case, VM 115. The present example shows only a single VM 115, though in other embodiments, the server 110 may include multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112 and 117 executing on top of that instance. Briefly, application 112 provides read/write access to the clients 160 to data stored in cluster 135. Application 117 is a system monitoring tool described in more detail below. In some embodiments, different types of VM hypervisors 113 may be used (e.g., VMware™ ESX, Microsoft™ Hyper-V, etc.).

Each storage system 100 may be configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100a and 100b, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

System monitoring tool 117 may monitor the storage objects of system 190, where the storage objects include any hardware or software component that is included in the architecture of system 190 or affects the performance of the system 190. Examples of storage objects include the underlying storage drives (e.g., HDDs and SSDs), virtual volumes, storage controllers, storage subsystems, aggregates of storage subsystems, network connections, virtual machines, hypervisors, applications, network, and the like.

System monitoring tool 117 may include the ability to determine communicative and architectural relationships among the different storage objects in the system. For instance, monitoring tool 117 may include a discovery function that uses communication protocols defined by Application Programming Interfaces (APIs) to communicate with the nodes to receive data regarding the nodes. Monitoring tool 117 may receive a variety of information types including, but not limited to, hardware and software data, configuration data for switch ports, volumes, network communication data, and the like. Monitoring tool 117 may determine an architectural and topological understanding of the system by examining the received data. For example, storage objects may be organized in a hierarchy in which a storage object is associated with other storage objects. In an example, a parent storage object may contain a set of child storage objects. For instance, a volume contains many subdirectories (e.g., qtrees), and a network contains many storage arrays.

Application 117 is a system monitoring application that provides for data collection and analysis of managed storage objects of system 190 and persists their discovery in a database. For the purposes of this example, application 114 is described as the reporting tool. The reporting tool 114 parses the data stored in the database and generates reports that are displayed to users. The reporting tool 114 submits queries to the database that is optimized for query transactions and generates results from the queries. As explained above with respect to FIG. 1, monitoring tool 117 may be run in a VM in a storage server; additionally or alternatively, the reporting tool 114 may be embodied as an application run on a client or on any appropriate computer in communication with cluster 135.

III. Example Process Flow

A. Scan Network for Storage Objects

Figure 2:
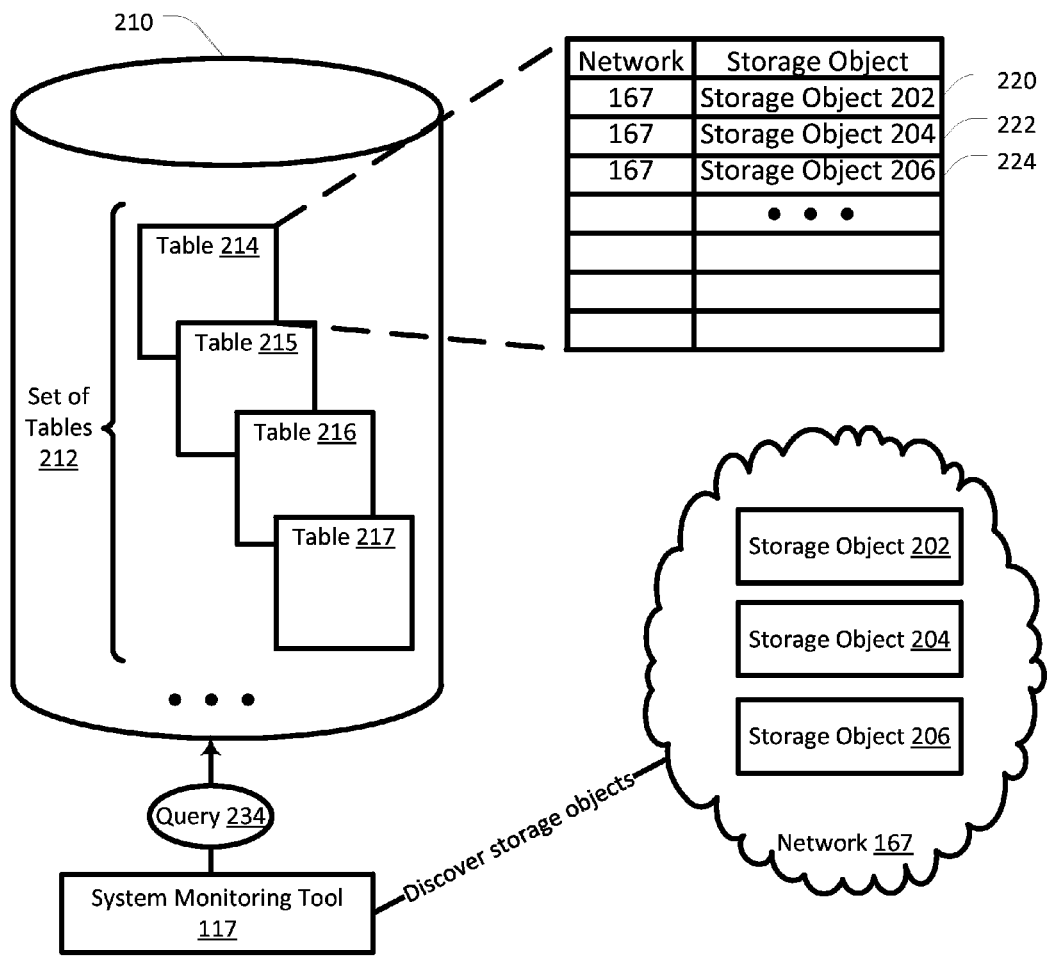
FIG. 2 is a block diagram of a database including a set of tables, consistent with some embodiments.

FIG. 2 is a block diagram of a database 210 including a set of tables 212, consistent with some embodiments. In FIG. 2, system monitoring tool 117 may scan network 167 for storage objects managed by a storage management system and identify one or more storage objects based on the scan. If system monitoring tool 117 discovers a new storage object, system monitoring tool 117 may persist the storage object in database 210. A "new storage object" may refer to a storage object that is not present in database 210 (or a particular table in database 210), and system monitoring tool 117 may update database 210 to reflect the newly discovered storage object. To reflect the newly discovered storage object, system monitoring tool 117 inserts an entry into one or more tables of the set of tables 214-217. Although the updates to set of tables 212 may be described as being associated with discovering new storage objects, this is not intended to be limiting and set of tables 212 may be updated with other data and/or based on other system events.

In the example illustrated in FIG. 2, set of tables 212 includes four tables 214-217. This is not intended to be limiting, and database 210 may include fewer or more than four tables. Table 214 stores information on storage objects managed by the enterprise storage management system. Table 214 includes entries 220, 222, and 224, and indicates that storage objects 202, 204, and 206 are on network 167. System monitoring tool 117 may have inserted entries 220, 222, and 224 into table 214 upon discovering networks nodes 202, 204, and 206, respectively, on network 167. In an example, system monitoring tool 117 submits a database query 234 (e.g., insertion, deletion, or modification) that is executed against set of tables 212. In an example, the database query 234 is an insert command that inserts an entry associated with storage object 202 into table 214.

B. Create Materialized View

System monitoring tool 117 interacts with database 210 and creates a materialized view based on the set of tables 212. System monitoring tool 117 may build a data warehouse from the data present in database 210 (e.g., set of tables 212) using materialized views. The materialized views may be considered as a data warehouse. Reporting tool 114 may query and use the materialized views to generate reports for users.

Figure 3:
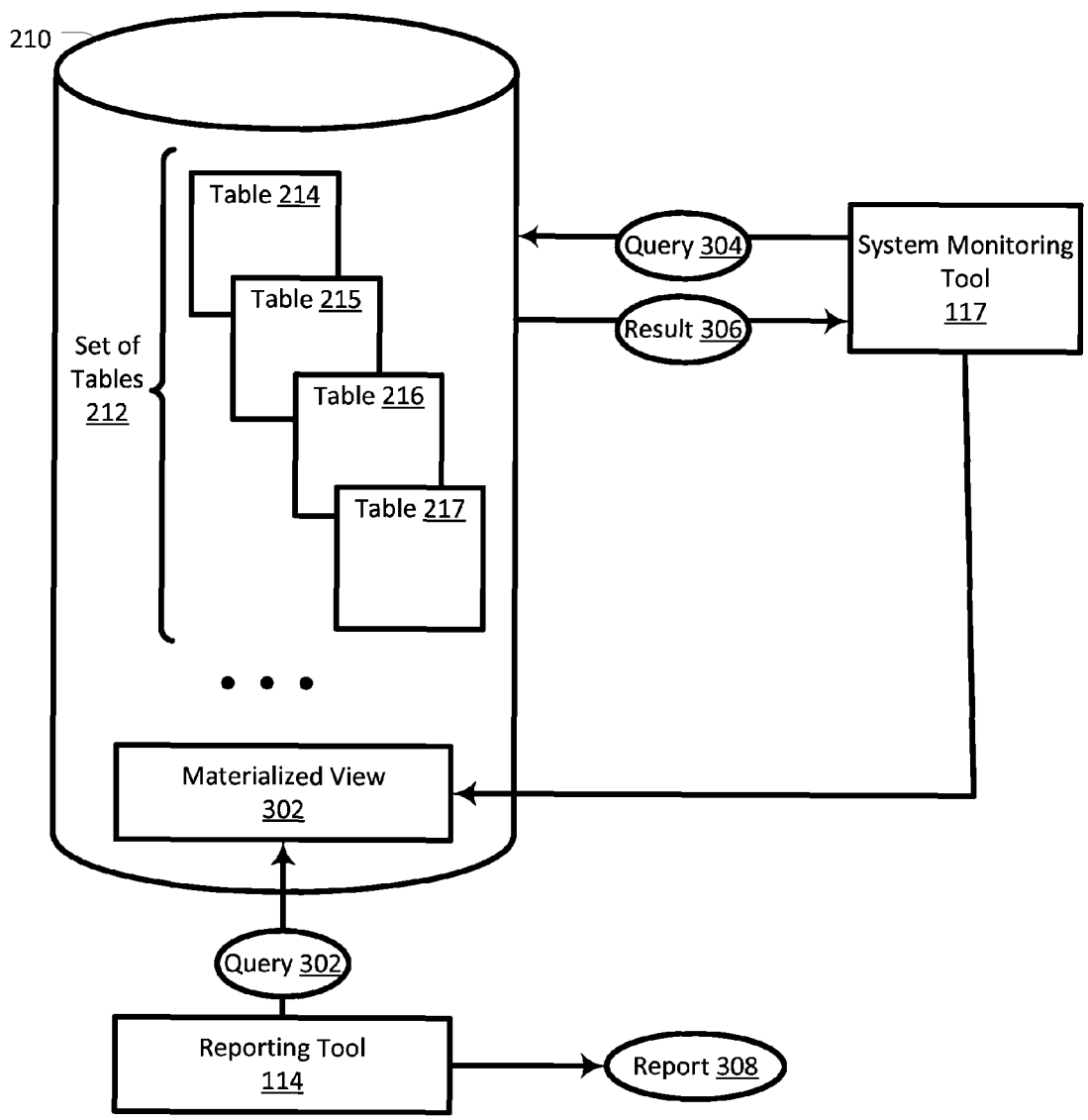
FIG. 3 is a process flow diagram of a system monitoring tool creating a materialized view that is used by a reporting tool to generate reports, consistent with some embodiments.

FIG. 3 is a process flow diagram of system monitoring tool 117 creating a materialized view 302 that is used by reporting tool 114 to generate reports, consistent with some embodiments. Although one materialized view is illustrated in FIG. 3, it should be understood that the data warehouse may include multiple materialized views.

System monitoring tool 117 submits a database query 304 that is executed against set of tables 212 in database 210. Database query 304 may be, for example, a SELECT command in Standard Query Language (SQL) that joins tables of set of tables 212 together and selects rows in the joined table meeting criteria specified in query 304. System monitoring tool 117 may receive a result 306 of query 304 and create materialized view 302 based on result 306 of query 304 executed against set of tables 212 stored in database 210. Materialized view 302 is based on data stored in the underlying set of tables 212. System monitoring tool 117 may store materialized view 302 in database 210. Accordingly, it may be unnecessary to extract data that is collected by system monitoring tool 117 and stored in set of tables 212, transform the extracted data, and deploy the transformed data on another server for generating reports. Rather, reporting tool 114 may query and use the data in materialized view 302 for report generation.

The schema for materialized view 302 is designed to be efficient for querying. In particular, the schema of materialized view 302 may be conducive to retrieving data and generating one or more reports 308. For example, rather than have reporting tool 114 execute query 304 against set of tables 212 each time a user requests report 308, system monitoring tool 117 may create materialized view 302 and store it in database 210 for reporting tool 114 to extract information from when requested by users. Accordingly, it may be unnecessary for reporting tool 114 to access a system that is separate from database 210 to generate reports. Rather, reporting tool 114 may execute the query against materialized view 302 stored in database 210 to generate one or more reports 308. Reporting tool 114 may generate reports based on user requests.

C. Refresh Data in the Data Warehouse

It is desirable to refresh materialized view 302 from set of tables 212 to keep the data warehouse and the data in set of tables 212 in synchronization. The present disclosure provides techniques for refreshing materialized views so that the number of refreshes is kept to a minimum while mitigating the risk that the corresponding data in the data warehouse is stale.

An advantage of an embodiment may provide for space efficiency. For example, the data warehouse and database 210 may be in a single production database. Accordingly, overall system cost may be reduced because separate systems hosting the monitoring and reporting data systems may be avoided.

Another advantage of an embodiment may provide for on-the-fly report generation. Data present in database 210 may automatically be refreshed into the data warehouse before the materialized views are queried. In contrast, in a traditional way, if a report is generated the data stored in database 210 is extracted, transformed, and loaded into the data warehouse first. After the data is loaded into the data warehouse, reports are generated based on the user requests.

Another advantage of an embodiment may provide for refresh policies that reduce the number of refreshes that occur by taking advantage of the database update patterns of the system monitoring tool 117. This may ensure that the data displayed in reports generated by reporting tool 114 are in synchronization with the set of tables 212 while at the same time minimizing the refresh of the materialized views from the set of tables 212.

Another advantage of an embodiment may avoid contention for access to the tables affecting the performance of both the monitoring and reporting of data because system monitoring tool 117 and reporting tool 114 work on a single database 210. For example, the materialized views are not computed from database tables like a view. Accordingly, system monitoring tool 117 and reporting tool 114 may access separate tables.

1. Update the Database

Figure 4:
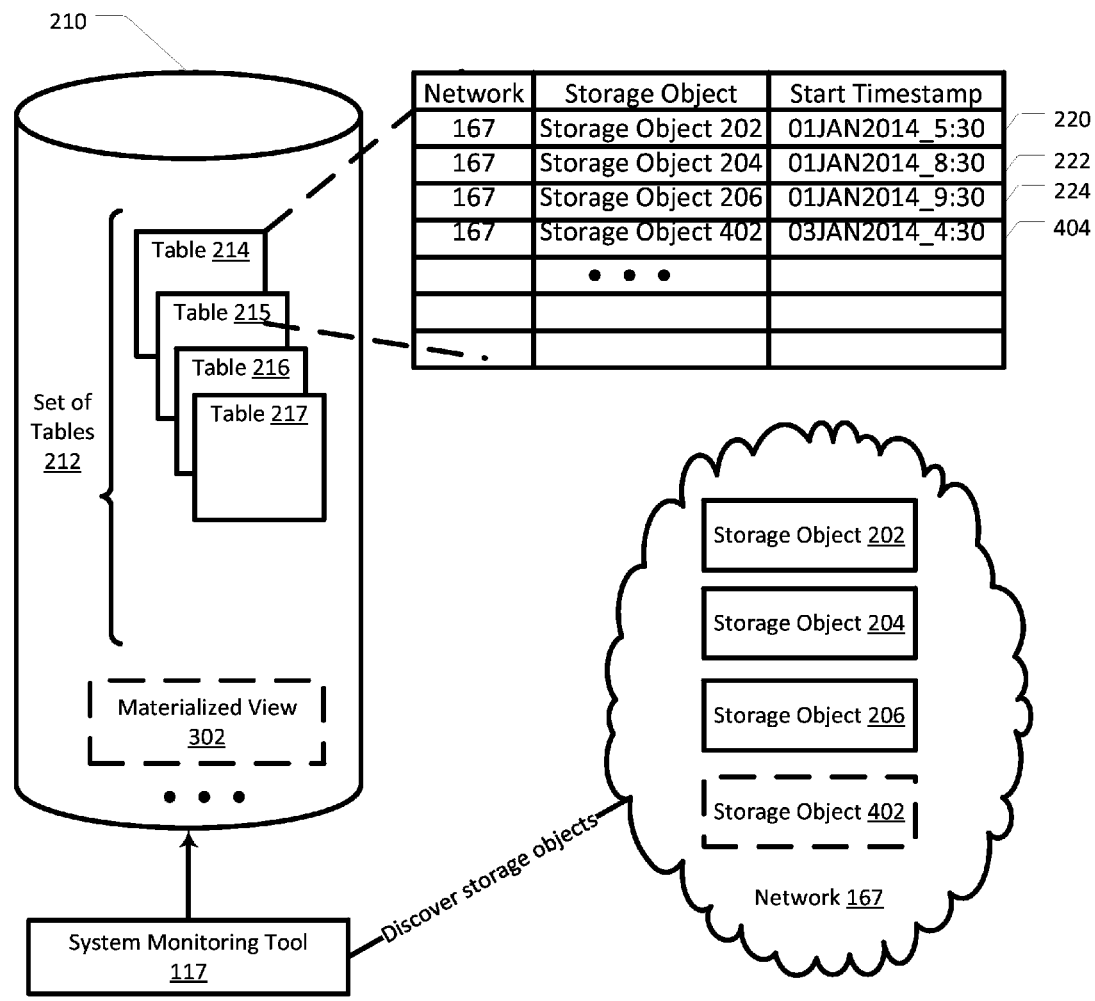
FIG. 4 is a block diagram of a new storage object being discovered by the system monitoring tool, consistent with some embodiments.

In an example, system monitoring tool 117 may scan network 167 and discover a new storage object. System monitoring tool 117 may start at a new network or rescan a network to discover storage objects on the network. FIG. 4 is a block diagram of a new storage object 402 on network 167 being discovered by system monitoring tool 117, consistent with some embodiments. As discussed, during the process of discovering new storage objects on a network, system monitoring tool 117 may insert entries into database 210 to persist the newly discovered storage objects. In an example, system monitoring tool 117 discovers new storage object 402 and inserts an entry 404 into table 214 in database 210.

An entry may include the particular storage object along with initial information, such as a timestamp at which the storage object was discovered. For example, entry 220 indicates that storage object 202 was discovered on Jan. 1, 2014 at 5:30 A.M, entry 222 indicates that storage object 204 was discovered on Jan. 1, 2014 at 8:30 A.M, entry 224 indicates that storage object 206 was discovered on Jan. 1, 2014 at 9:30 A.M, and entry 404 indicates that storage object 402 was discovered on Jan. 3, 2014 at 4:30 A.M.

After the storage objects on the networks are discovered, the updates to the database tables may be minimal. For example, new storage objects may be added to the tables when there is a manual intervention (e.g., storage provisioning). After the discovery of storage object 402 is persisted in database 210 (e.g., entry 404 inserted into table 214), set of tables 212 is no longer in synchronization with materialized view 302, as indicated by the dashed lines in FIG. 4. Referring back to FIG. 3, materialized view 302 was created based on result 306 of database query 304 executed against set of tables 212 before it included information about the newly discovered storage object 402.

It may be desirable to refresh the data warehouse. An objective of a policy for refreshing data in a data warehouse (e.g., materialized view 302) may be to ensure that the number of refreshes made on a materialized view is reduced. For example, it may be unnecessary to refresh the materialized view each time a storage object is discovered and persisted in database 210 (even if an underlying table on which a materialized view is based is modified). Another objective of a policy for refreshing data in a data warehouse may be to ensure that the data in the materialized views is in synchronization with the database tables when a query is submitted to the materialized views.

2. Hierarchy of Storage Objects

Storage objects are organized into a hierarchy in which a parent storage object is associated with one or more child storage objects. For example, a parent storage object may "contain" one or more child storage objects. For instance, a volume may contain one or more subdirectories (e.g., qtrees), and a network may contain one or more storage arrays. The hierarchy may be leveraged to minimize the number of refreshes to a materialized view corresponding to the database tables including the newly discovered storage object.

Figure 5:
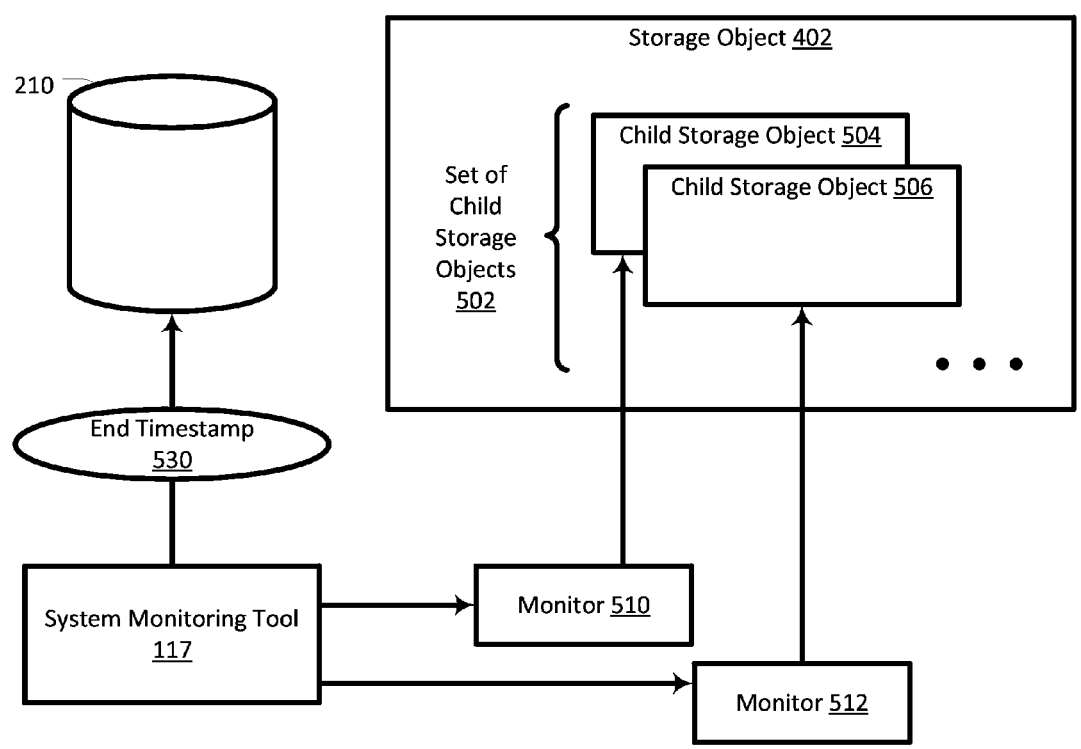
FIG. 5 is a block diagram of a storage object containing a set of child storage objects, consistent with some embodiments.

FIG. 5 is a block diagram of parent storage object 402 associated with a set of child storage objects 502, consistent with some embodiments. System monitoring tool 117 may discover a set of child storage objects 502 associated with parent storage object 402, where the set of child storage objects 502 includes child storage objects 504 and 506. In an example, the set of child storage objects 502 is "contained in" parent storage object 402. System monitoring tool 117 may insert corresponding entries into one or more tables (e.g., table 214) of set of tables 212, the entries including information associated with child storage objects 504 and/or 506.

In some embodiments, system monitoring tool 117 discovers a new storage object and spawns off one or more monitors to discover child storage objects associated with parent storage object 402. For example, system monitoring tool 117 may spawn monitors 510 and 512 to discover child storage objects associated with parent storage object 402, the newly discovered storage object. System monitoring tool 117 may recursively spawn monitors to discover child storage objects associated with child storage objects associated with parent storage object 402.

In FIG. 5, system monitoring tool 117 spawns monitor 510 to discover child storage object 504 and/or its child storage objects associated with parent storage object 402, and spawns monitor 512 to discover child storage object 506 and/or its child storage objects associated with parent storage object 402. A monitor inserts an entry into database 210 to persist the discovery of a new storage object and may also include initial information such as a start timestamp at which the new storage object (e.g., child storage objects 504 and 506) was discovered. The start timestamp may indicate incomplete discovery, stalled discovery, or general knowledge about when a new storage object was brought on-line.

In some embodiments, system monitoring tool 117 persists a discovery of a parent storage object and a set of child storage objects associated with the parent storage object to the database. Rather than update the materialized view when the parent storage object or each of the child storage objects are discovered, system monitoring tool 117 may wait until the last child storage object is discovered so as to limit the number of refreshes to the materialized view to reduce the overhead associated with refreshing materialized views. In many instances, this is a good compromise as the discoveries of the child storage objects may occur relatively soon after discovery of the parent storage object so that information in the materialized view is still kept reasonably current.

After a last child storage object associated with a parent storage object is discovered, system monitoring tool 117 may store an end timestamp 530 at which the last child storage object was discovered. End timestamp 530 may signify the end time that the discovery was updated. A table may have a last updated timestamp. Each time a table is updated, the table's last updated time stamp may be updated as well.

The last child storage object may refer to the absolute last storage object that is discovered in the hierarchy having parent storage object 402 as the root or may refer to each leaf of the hierarchy having parent storage object 402 as the root. In an example, if storage objects 504 and 506 contain no child storage objects, the last child storage object may be, for example, child storage object 506 if it is discovered after child storage object 504. In this example, system monitoring tool 117 may recognize an end timestamp at which child storage object 506 was discovered and store the end timestamp in database 210. The last updated time stamp of the table in which the end timestamp is stored may be updated to be the end timestamp.

System monitoring tool 117 may insert multiple end timestamps for each of the one or more last child storage objects. The last end timestamp may indicate the last update time for table 214. In an example, if storage object 504 does not contain any child storage objects and storage object 506 contains a set of child storage objects, monitor 510 may note an end timestamp at which child storage object 504 was discovered and store this end timestamp in database 210. Additionally, monitor 512 may note an end timestamp at which the last recursive child storage object of storage object 506 was discovered and store this end timestamp in database 210. In such an example, a last storage object for child storage object 504 may be storage object 504 (because in the example storage object 504 does not have children) and a last storage object for child storage object 506 may be the last recursive child storage object of storage object 506 that was discovered.

In another example, if each of storage object 504 and storage object 506 contains a set of child storage objects, monitor 510 may note an end timestamp at which the last recursive child storage object of storage object 504 was discovered and store this end timestamp in database 210. Additionally, monitor 512 may note an end timestamp at which the last recursive child storage object of storage object 506 was discovered and store this end timestamp in database 210. In such an example, a last storage object for child storage object 504 may be the last recursive child storage object of storage object 504 that was discovered and a last storage object for child storage object 506 may be the last recursive child storage object of storage object 506 that was discovered. In some examples, when the absolute last child storage object is discovered, the time stamp for the parent storage object may be updated as well indicating that all the children of the parent storage object are discovered.

In another example, monitor 510 may note an end timestamp at which the absolute last child storage object of parent node 402 was discovered and store this end timestamp in database 210. In such an example, a last storage object for parent storage object 402 may be the absolute last recursive child storage object in parent storage object 402's lineage that was discovered. In some examples, when the absolute last child storage object is discovered, the time stamp for the parent storage object may be updated as well indicating that all the children of the parent storage object are discovered.

In some embodiments, storage object 402 has only one last child storage object, which is the absolute last recursive child storage object that is discovered across the set of child storage objects 502. In an example, the last child storage object that is discovered between monitors 510 and 512 is considered the absolute last recursive child storage object of storage object 402. In such an example, system monitoring tool 117 may note an end timestamp at which the absolute last recursive child storage object of storage object 402 was discovered and store this end timestamp in database 210. The end timestamp may be associated with the absolute last recursive child storage object and/or a parent of the absolute last recursive child storage object. When the absolute last child storage object is discovered, the time stamp for the parent storage object may be updated as well indicating that all the children of the parent storage object are discovered.

In an embodiment, the parent monitor is in a synchronous mode and waits for the last child storage object to be discovered. In another embodiment, the parent monitor is in an asynchronous mode and continues with other work and polls a child monitor at certain intervals to determine whether the last child storage object has been discovered.

To reduce the number of refreshes to materialized view 302, system monitoring tool 117 may delay a refresh of materialized view 302 until after a last child storage object of the set of child storage objects has been discovered. After discovering the last child storage object, system monitoring tool 117 may refresh materialized view 302. System monitoring tool 117 refreshes materialized view 302 by executing a database query against the updated set of tables, which now stores data regarding the newly discovered storage objects.

Figure 6:
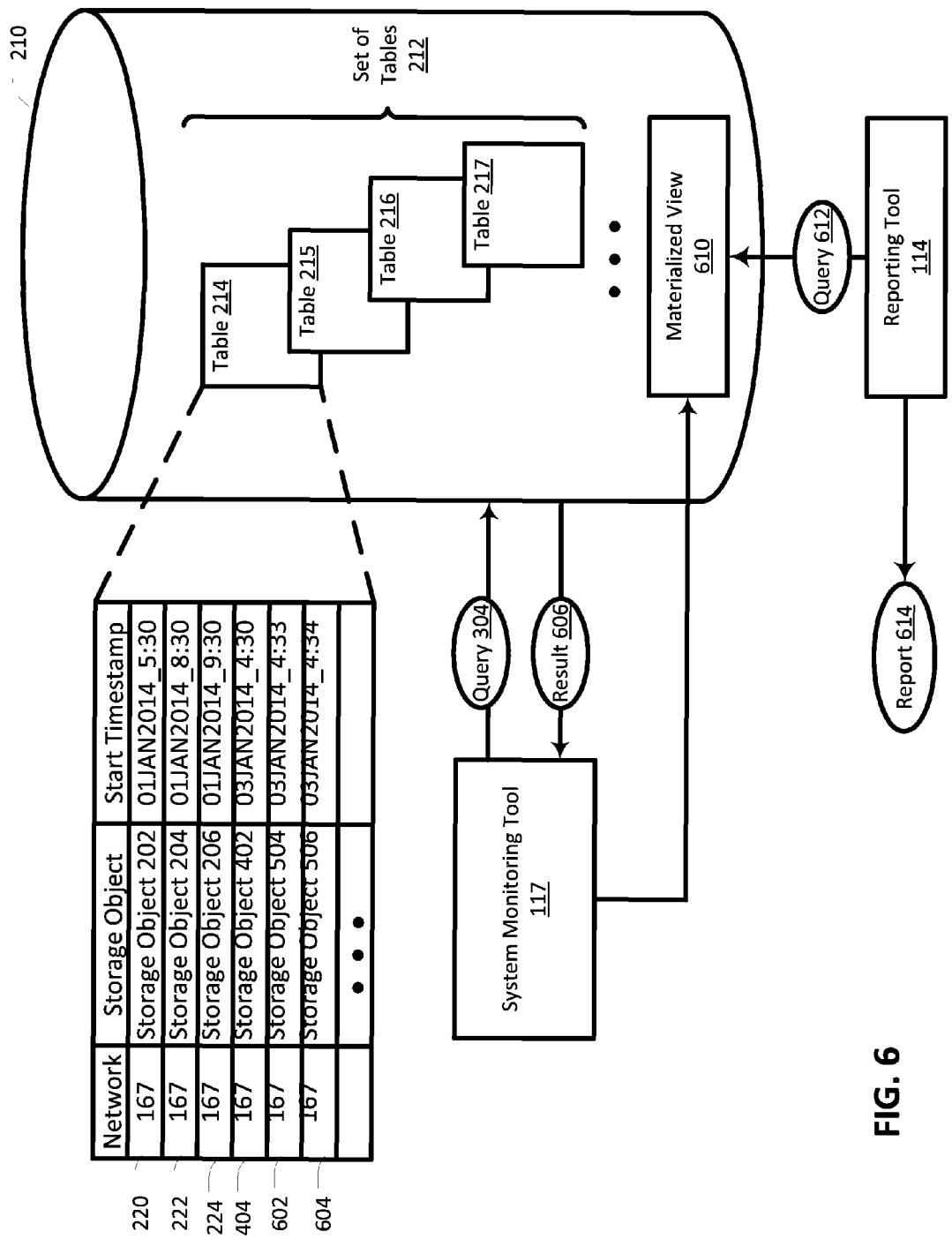
FIG. 6 is a block diagram of the system monitoring tool submitting a query to an updated set of tables and refreshing the materialized view based on a result of the query, consistent with some embodiments.

FIG. 6 is a block diagram of system monitoring tool 117 submitting query 304 to the updated set of tables 212 and refreshing materialized view 302 based on a result of the query 304, consistent with some embodiments. In FIG. 6, table 214 includes entries 220, 222, 224, and 404 along with entries 602 and 604. Entry 602 includes child storage object 504 associated with parent storage object 402, and entry 604 includes child storage object 506 associated with parent storage object 402. One or more of the other tables in set of tables 212 may have been updated since materialized view 302 was generated in FIG. 3.

In some embodiments, after a last child storage object is discovered and an entry including the last child storage object is inserted into database 214, system monitoring tool 117 may submit query 304 to the set of tables 212, which now includes updated data. System monitoring tool 117 may receive an updated result 606 based on the submitted query.

System monitoring tool 117 may receive result 606 of query 304 executed against the updated set of tables 212 stored in database 210. Result 606 may be different from result 306 in FIG. 3 because set of tables 212 in FIG. 6 has updated data (e.g., entries 602 and 604) that was not present in FIG. 3. After discovering the last child storage object and inserting entry 602 and/or 604 into set of tables 212, system monitoring tool 117 may refresh materialized view 302 based on the updated result 606 of query 604 to determine a refreshed materialized view 610. System monitoring tool 117 may store refreshed materialized view 610 in database 210 for querying by reporting tool 114. Reporting tool 114 may submit one or more queries 612 to refreshed materialized view 610 to generate reports for users rather than submitting the one or more queries 612 to materialized view 302. Accordingly, materialized view 302 is updated to materialized view 610.

A monitor may refresh a materialized view based on the tables updated by the monitor. For example, after monitor 510 discovers the last child storage object associated with child storage object 504 and persists the discovery in database 210, monitor 510 may identify the tables that it updated and refresh materialized views that are created from those updated tables. Similarly, after monitor 512 discovers the last child storage object associated with child storage object 506 and persists the discovery in database 210, monitor 512 may identify the tables that it updated and refresh materialized views that are created from those updated tables. Accordingly, the updated data may incrementally be reflected in the refreshed materialized views. In this way, multiple entries of a storage object may be synchronized into a materialized view in a single refresh.

In an example, parent network node 402 of type X contains 10 child network nodes of type Y, each of which contains 100 child network nodes of type Z. In response to discovering parent network node 402, system monitoring tool 117 may update its start timestamp and spawn 10 monitors for each of parent network node 402's child network nodes of type Y. For each network node of type Y, system monitoring tool 117 may spawn monitors for network nodes of type Z. If 9 out of 10 Y network nodes have been discovered completely, 900 Z objects and may have been previously refreshed into the materialized view of network node of type Z. After 100 Z objects in the 10th Y network node have been discovered, system monitoring tool 117 may update its end timestamp and refresh 100 Z network nodes into the materialized view of network node of type Z. System monitoring tool 117 may then update the end timestamp of the X network node and refresh the 10 Y network nodes into the materialized view of object Y.

3. Compare Timestamps

To reduce the number of times that a materialized view is refreshed, it may be desirable to refresh the materialized view just before it is queried by reporting tool 114 rather than each time an update to an underlying table occurs.

System monitoring tool 117 may refresh the materialized views before generating a report. When a report requesting data stored in set of tables 212 is requested, system monitoring tool 117 may identify a materialized view update timestamp for a materialized view corresponding to the set of tables 212. The materialized view update timestamp indicates a last update time of the materialized view. For example, the materialized view update timestamp for materialized view 302 may correspond to the time at which materialized view 302 was last created and/or updated.

System monitoring tool 117 may also identify an update timestamp of the set of tables 212. The update timestamp of the set of tables 212 indicates a last update time of the set of tables 212. Database 210 may include a table that holds the last update time for a database table versus its materialized view update timestamp. In an example, each table in the set of tables 212 may be associated with an end timestamp, which indicates the last time that the particular table was updated. The table to materialized view relationship is known to system monitoring tool 117, which may selectively refresh the corresponding materialized views. In an example, system monitoring tool 117 may use a table that stores the table name, materialized view created on the table, and the last update time of the materialized view may be used to determine the underlying tables of a materialized view. The update time for a table may be the latest update on the objects monitored (e.g., rows of the table). The materialized view update time may be the last time system monitoring tool 117 refreshed the corresponding materialized view.

In some embodiments, system monitoring tool 117 may compare the materialized view update timestamp to an update timestamp of one or more tables of the set of tables from which the materialized view is based upon. In some embodiments, when a request for a report that uses data from one or more tables of the set of tables 212 is received by reporting tool 114, system monitoring tool 117 may compare the materialized view update timestamp and the update timestamp of the corresponding tables. In an example, system monitoring tool 117 determines whether the materialized view update timestamp is later than the update timestamps of the set of tables 212. In another example, system monitoring tool 117 determines whether the materialized view update timestamp is earlier than the update timestamps of the set of tables 212.

In response to determining that the materialized view update timestamp is later than each update timestamp of the set of tables, it is unnecessary for system monitoring tool 117 to refresh materialized view 302. If the materialized view update timestamp is later than the update timestamps of each table of the set of tables 212, the data in the materialized view is current and reporting tool 114 may query the current materialized view without refreshing it first. For example, referring to FIGS. 3 and 6, system monitoring tool 117 may have refreshed materialized view 302 to create materialized view 610 after the last storage object was discovered and persisted in database 210, as discussed above. In such an example, reporting tool 114 may query materialized view 610 without refreshing it first and may then generate report 614 based on a result of the query.

In contrast, in response to determining that the materialized view update timestamp is earlier than an update timestamp of the set of tables 212, system monitoring tool 117 refreshes the materialized view. In such an example, if the materialized view update timestamp is more than a threshold older than the last update timestamp of the set of tables 212, system monitoring tool 117 may refresh all the materialized views queried by the report. System monitoring tool 117 refreshes the materialized views for the tables on which the query will be run for reporting.

If the materialized view update timestamp is earlier than an update timestamp of the set of tables 212, the data in the current materialized view is stale. For example, referring to FIGS. 3 and 6, system monitoring tool 117 may have refreshed materialized view 302 to create materialized view 610 after the last storage object was discovered and persisted in database 210, as discussed above. In such an example, reporting tool 114 may refresh materialized view 610 to create a second refreshed materialized view (not shown). It is important to note that one materialized view is being refreshed and exists. For example, if materialized view 610 is refreshed, it is updated to the second refreshed materialized view. Reporting tool 114 may then query the second refreshed materialized view (rather than materialized view 610, which has stale data) and generate a report based on a result of the query executed against the second refreshed materialized view.

It may be desirable to capture the refresh of a materialized view based on a hierarchy in which a storage object is associated with other storage objects, so as to minimize refreshes even further. An embodiment may leverage the database update patterns by recognizing hierarchies in which storage objects are organized. Accordingly, system monitoring tool 117 may delay refreshing a materialized view until a last child storage object associated with a parent storage object is discovered and persisted to the database. Additionally, an embodiment may avoid refreshing the materialized views when they may not be required (irrespective of whether the monitor discovered new storage objects or not) by ensuring that the data in the applicable materialized views are in synchronization with the database tables before the materialized views are queried. Accordingly, the updates to be synchronized into the materialized views may be reduced, thus reducing the overall time it takes to process or display a report.

It should be noted that the examples above are given in the context of a network storage system, through the scope of embodiments is not so limited. Rather, the concepts described above may be implemented with any updates to a database table and are not limited to discovery of storage objects.

IV. Example Method

Figure 7:
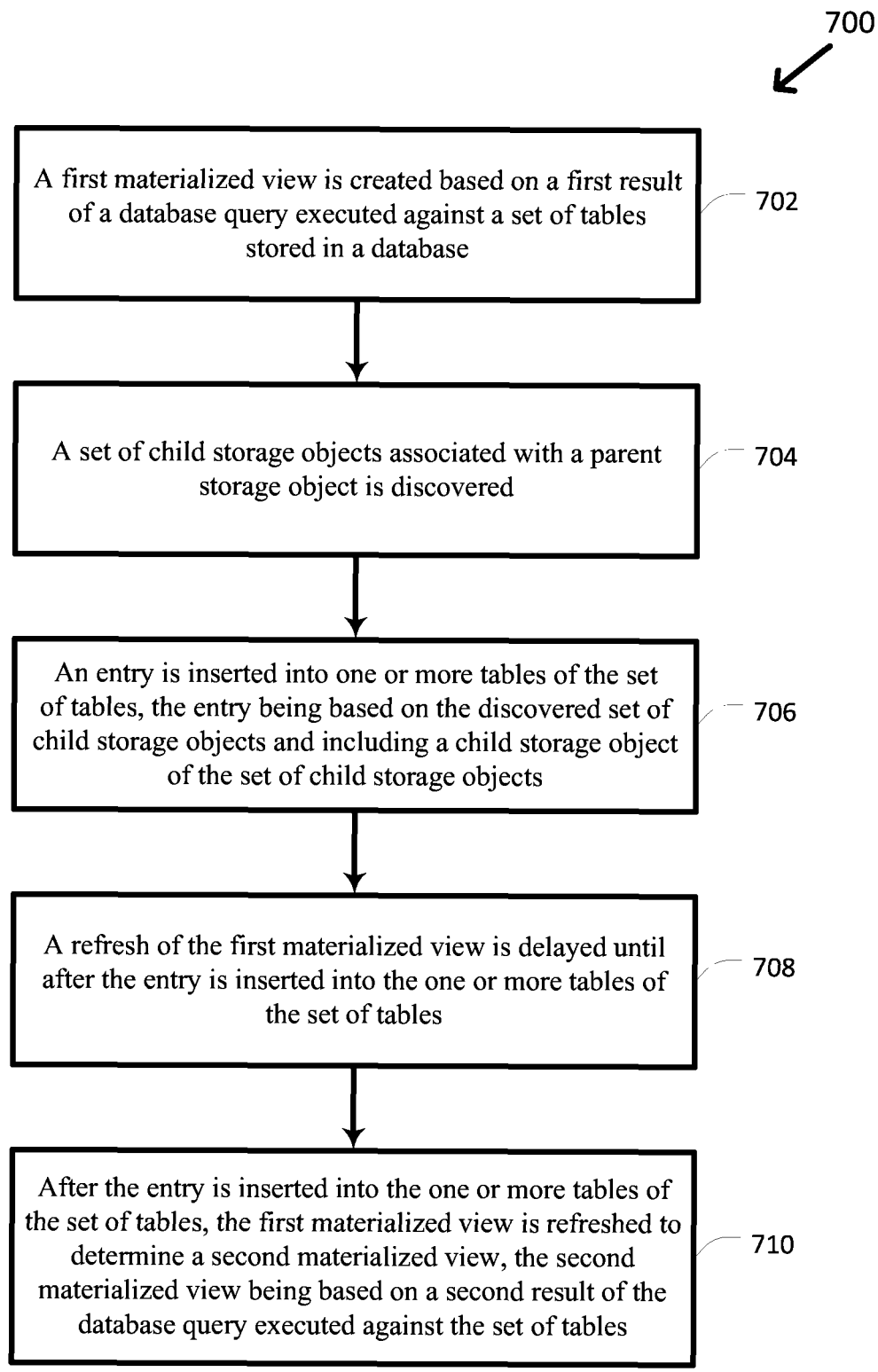
FIG. 7 is a flowchart illustrating a method of refreshing a materialized view, according to some embodiments.

FIG. 7 is a flowchart illustrating a method of refreshing a materialized view, according to some embodiments. Method 700 is not meant to be limiting and may be used in other applications.

Method 700 includes blocks 702-710. In a block 702, a first materialized view is created based on a first result of a database query executed against a set of tables stored in a database. In an example, system monitoring tool 117 creates materialized view 302 based on result 306 of database query 304 executed against set of tables 212 stored in database 210.

In a block 704, a set of child storage objects associated with a parent storage object is discovered. In an example, system monitoring tool 117 discovers a set of child storage objects 502 associated with parent storage object 402.

In a block 706, an entry is inserted into one or more tables of the set of tables, the entry being based on the discovered set of child storage objects and including a child storage object of the set of child storage objects. In an example, system monitoring tool 117 inserts, based on discovering set of child storage objects 502, an entry 602, 604 into one or more tables of the set of tables 512, where the entry 602, 604 includes a child storage object of the set of child storage objects 512. In an example, the entry includes the last child storage object associated with a parent storage object.

In a block 708, a refresh of the first materialized view is delayed until after the entry is inserted into the one or more tables of the set of tables. In an example, system monitoring tool 117 delays a refresh of materialized view 302 until after the entry 602, 604 is inserted into the one or more tables of the set of tables 212.

In a block 710, after the entry is inserted into the one or more tables of the set of tables, the first materialized view is refreshed to determine a second materialized view, the second materialized view being based on a second result of the database query executed against the set of tables. In an example, after the entry is inserted into the one or more tables of the set of tables, system monitoring tool 117 refreshes materialized view 302 to determine materialized view 610, which is based on a second result of the database query executed against the set of tables 212. Materialized view 302 may then be queried by reporting tool 114.

It is also understood that additional processes may be performed before, during, or after blocks 702-710 discussed above. It is also understood that one or more of the blocks of method 700 described herein may be omitted, combined, or performed in a different sequence as desired. Additionally, blocks 702-710 may be performed for any number of occurrences for a requested report and/or updates to set of tables 212.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, server 163, storage controllers 101 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of the blocks in FIG. 7.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of refreshing a materialized view, comprising:
creating a first materialized view based on a first result of a database query executed against a set of tables stored in a database;
discovering a parent storage object;
inserting, based on the discovering the parent storage object, a second entry into one or more tables of the set of tables, the second entry including the parent storage object;
discovering a set of child storage objects associated with the parent storage object;
wherein the discovering a set of child storage objects includes discovering the last child storage object of the set of child storage objects, and wherein the entry includes the last child storage object, the method further including:
identifying a materialized view update timestamp for the second materialized view, the materialized view update timestamp indicating a last update time of the second materialized view;
identifying an update timestamp of one or more tables of the set of tables, an update timestamp of a given table indicating a last update time of the given table;
comparing the materialized view update timestamp to the update timestamp of one or more tables of the set of tables; and determining, based on the comparing, whether to refresh the second materialized view;
inserting, based on the discovering a set of child storage objects, an entry into one or more tables of the set of tables, the entry including a child storage object of the set of child storage objects;
wherein the parent storage object and the set of child storage objects are based on a storage hierarchy representing hardware and software resources for storing data at a storage system;
updating a timestamp for the parent storage object with a timestamp of discovering a last of child storage object from among the set of child storage objects;
delaying a refresh of the first materialized view based on the updated timestamp for the parent storage object and until after the entry is inserted into the one or more tables of the set of tables; and
after the entry is inserted into the one or more tables of the set of tables, refreshing the first materialized view to determine a second materialized view, the second materialized view being based on a second result of the database query executed against the set of tables.

2. The method of claim 1, wherein the first materialized view is different from the second materialized view.

3. The method of claim 1, wherein the comparing includes determining whether the materialized view update timestamp is earlier than the update timestamp of the one or more tables of the set of tables, wherein in response to determining that the materialized view update timestamp is later than each update timestamp of the set of tables, determining to not refresh the second materialized view.

4. The method of claim 3, wherein in response to determining that the materialized view update timestamp is earlier than an update timestamp of the set of tables, determining to refresh the second materialized view.

5. The method of claim 1, further including: in response to determining to refresh the second materialized view, refreshing the second materialized view to determine a third materialized view; submitting a second database query to the third materialized view; and generating a report based on a result of the second database query.

6. The method of claim 5, further including: in response to determining to not refresh the second materialized view, submitting a second database query to the second materialized view; and generating a report based on a result of the second database query.

7. A computing device comprising:
a memory containing machine readable medium comprising machine executable code having stored thereon instructions for performing a method of refreshing a materialized view; and
a processor coupled to the memory, the processor configured to execute the machine executable code to:
update, based on discovering a last child storage object associated with a parent storage object, a set of tables stored in a database;
wherein the discovering a set of child storage objects includes discovering the last child storage object of the set of child storage objects, and wherein the entry includes the last child storage object, the system further including:
identifying a materialized view update timestamp for the second materialized view, the materialized view update timestamp indicating a last update time of the second materialized view;
identifying an update timestamp of one or more tables of the set of tables, an update timestamp of a given table indicating a last update time of the given table;
comparing the materialized view update timestamp to the update timestamp of one or more tables of the set of tables; and determining, based on the comparing, whether to refresh the second materialized view;
wherein the parent storage object and a set of child storage objects are based on a storage hierarchy representing hardware and software resources for storing data at a storage system;
update a timestamp for the parent storage object with a timestamp of discovering the last child storage object from among the set of child storage objects;
create a materialized view based on a result of a database query executed against the set of tables stored in the database;
compare a materialized view update timestamp to an update timestamp of one or more tables of the set of tables, wherein the materialized view update timestamp indicates a last update time of a first materialized view and an update timestamp of a given table indicates a last update time of the given table;
delay a refresh of the first materialized view based on the updated timestamp of the parent storage object and until after the last child storage object has been discovered; and
refresh the first materialized view to determine a second materialized view when the last child storage object is discovered, wherein the second materialized view is based on one or more tables affected by the discovery of the last.

8. The system of claim 7, wherein the system monitoring tool persists a discovery of the parent storage object and the set of child storage objects associated with the parent storage object to the database.

9. The system of claim 7, wherein the system monitoring tool spawns one or more monitors to discover child storage objects associated with the parent storage object.

10. The system of claim 7, wherein the system monitoring tool determines whether the materialized view update timestamp is earlier than an update timestamp of the set of tables, wherein in response to determining that the materialized view update timestamp is later than each update timestamp of the set of tables, the system monitoring tool determines to not refresh the second materialized view, and wherein in response to determining that the materialized view update timestamp is earlier than an update timestamp of the set of tables, the system monitoring tool determines to refresh the second materialized view to determine a third materialized view.

11. The system of claim 7, wherein the system monitoring tool determines whether the materialized view update timestamp is earlier than the update timestamp of the set of tables, wherein in response to determining that the materialized view update timestamp is earlier than an update timestamp of the set of tables, the system monitoring tool refreshes the materialized view and the reporting tool submits a query to the refreshed materialized view that is based on a second result of the database query executed against the set of tables.

12. The system of claim 11, further including:
a reporting tool that receives a request for a report that uses data from one or more tables of the set of tables.

13. The system of claim 12, wherein responsive to the reporting tool receiving the request, the system monitoring tool compares the materialized view update timestamp to the update timestamp of one or more tables of the set of tables.

14. The system of claim 12, wherein the reporting tool submits a second database query to the second materialized view when the materialized view update timestamp is later than each update timestamp of the set of tables and submits the second database query to the third materialized view when the materialized view update timestamp is earlier than an update timestamp of the set of tables.

15. A non-transitory machine readable medium having stored thereon instructions for performing a method, comprising machine executable code which when executed by at least one machine, causes the machine to:
create a first materialized view based on a first result of a database query executed against a set of tables stored in a database; discover a parent storage object;
insert, based on the discovering the parent storage object, a second entry into one or more tables of the set of tables, the second entry including the parent storage object;
discover a set of child storage objects associated with the parent storage object;
wherein discovering a set of child storage objects includes discovering the last child storage object of the set of child storage objects, and wherein the entry includes the last child storage object, the machine executable code further causes the machine to:
identify a materialized view update timestamp for the second materialized view, the materialized view update timestamp indicating a last update time of the second materialized view;
identify an update timestamp of one or more tables of the set of tables, an update timestamp of a given table indicating a last update time of the given table; compare the materialized view update timestamp to the update timestamp of one or more tables of the set of tables;
and determine, based on the compare, whether to refresh the second materialized view;
insert, based on the discovering a set of child storage objects, an entry into one or more tables of the set of tables, the entry including a child storage object of the set of child storage objects;
wherein the parent storage object and the set of child storage objects are based on a storage hierarchy representing hardware and software resources for storing data at a storage system;

update a timestamp for the parent storage object with a timestamp of discovering a last of child storage object from among the set of child storage objects;

delay a refresh of the first materialized view based on the updated timestamp for the parent storage object and until after the entry is inserted into the one or more tables of the set of tables; and after the entry is inserted into the one or more tables of the set of tables, refresh the first materialized view to determine a second materialized view, the second materialized view being based on a second result of the database query executed against the set of tables.

16. The non-transitory machine readable medium of claim 15, wherein the compare includes determining whether the materialized view update timestamp is earlier than the update timestamp of the one or more tables of the set of tables, wherein in response to determine that the materialized view update timestamp is later than each update timestamp of the set of tables, determine to not refresh the second materialized view.

17. The non-transitory machine readable medium of claim 15, wherein the machine executable code further causes the machine to: in response to determining to refresh the second materialized view, refresh the second materialized view to determine a third materialized view; submit a second database query to the third materialized view; and generate a report based on a result of the second database query.

18. The non-transitory machine readable medium of claim 15, wherein the machine executable code further causes the machine to: in response to determining to not refresh the second materialized view, submitting a second database query to the second materialized view; and generating a report based on a result of the second database query.

* * * * *